Feb. 10, 1942.                W. TAMMINGA                2,272,443
                         MILK DISPENSING APPARATUS
                         Filed May 24, 1940        2 Sheets-Sheet 2
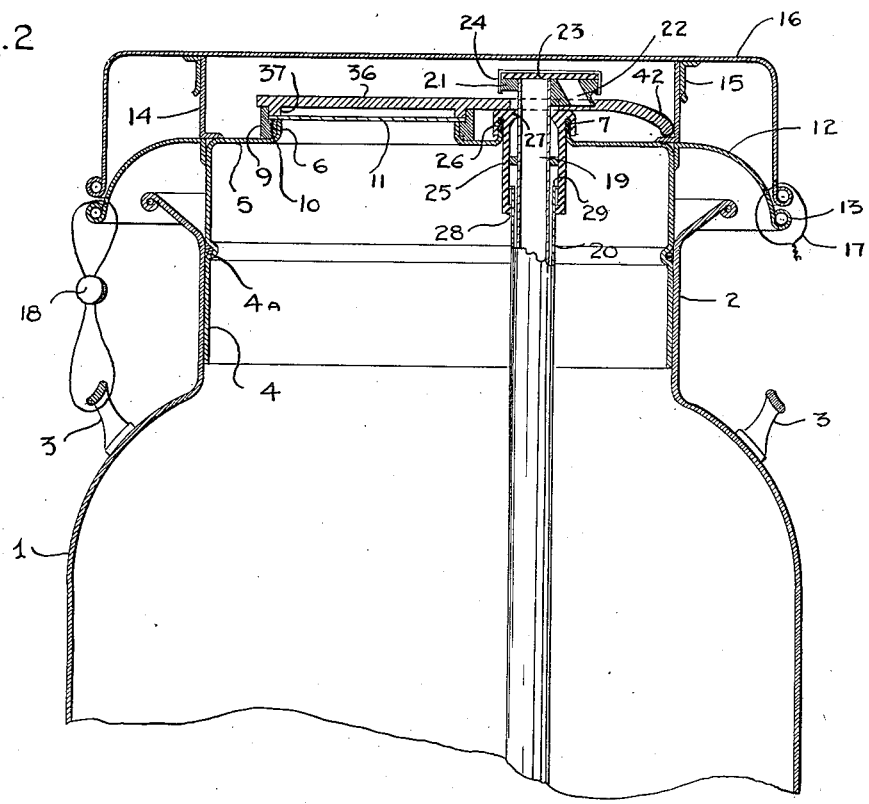
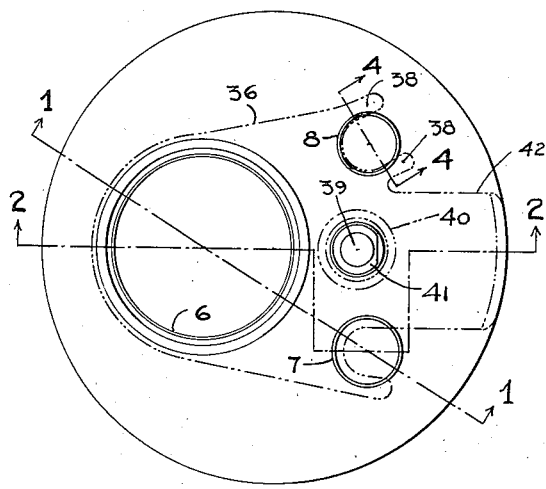
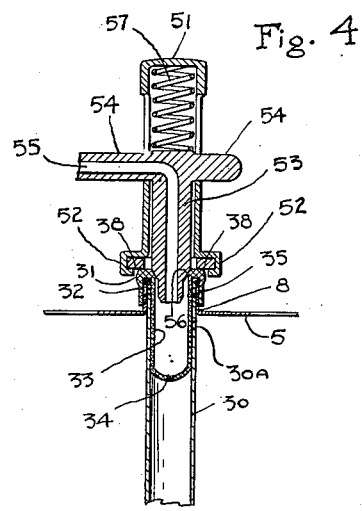
INVENTOR
WILLIAM TAMMINGA
BY Cornelius Zabriskie
ATTORNEY Patented Feb. 10, 1942

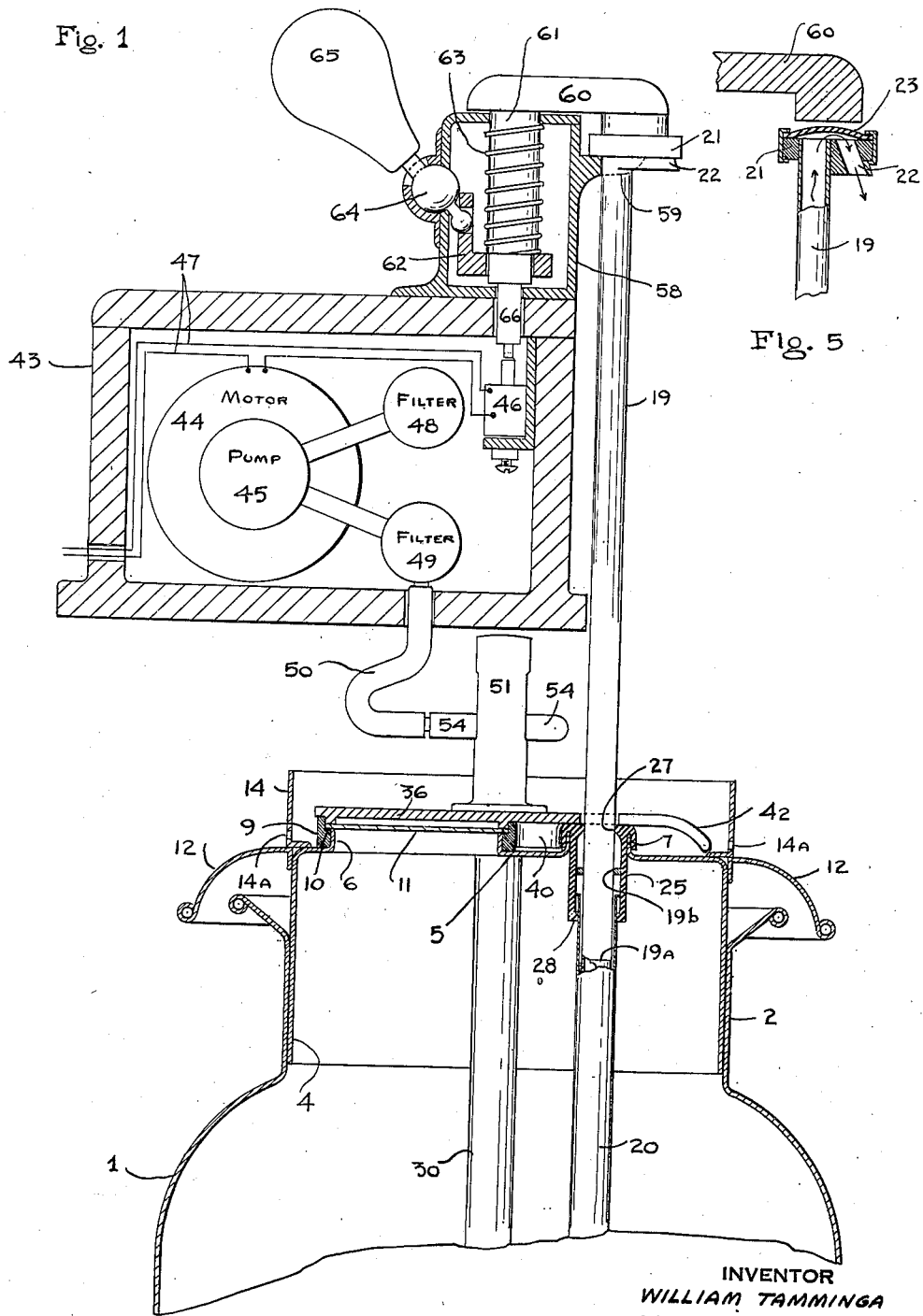

2,272,443

UNITED STATES PATENT OFFICE 2,272,443

MILK DISPENSING APPARATUS

William Tamminga, Bronx, N. Y., assignor to Monitor Process Corporation, Jersey City, N. J., a corporation of New Jersey Application May 24, 1940, Serial No. 336,912

14 Claims. (Cl. 221—77)

This invention relates to apparatus for the retailing of milk by the glass and is of a character wherein pressure is applied to the surface of the milk in a milk delivery can for the purpose of forcing the milk out of the can through a dispensing tube equipped with an appropriate spout.

The object of the invention is to provide simple, economical and efficient apparatus for such retail distribution of milk, as well as a satisfactory milk delivery can, to be employed in connection therewith.

The can forms an important part of this invention because of rigid requirements of the board of health to insure the sterile condition of the milk as dispensed to a customer. Cans for this purpose, generally of the twenty and forty quart variety must, in order to meet health regulations, be capable of efficient sterilization at the creamery at which the milk is introduced into the can and, in the preferred practice, all parts of the dispensing mechanism which come into contact with the milk are associated with the can in such a way that they are sterilized with the can and form a part of the milk package shipped from the creamery to the retailer. Suitable safeguards must be provided to maintain the sterile condition of the can and associated parts, so that, when the milk leaves the can for delivery into a tumbler for the purchaser, all parts through which it passes and all parts which come into contact with it will be free from foreign matter and completely sterile, so as not to pollute the milk in any way.

Milk delivery cans comprise a can provided with an appropriate cover. An important feature of the present invention resides in the fact that any conventional delivery can may be employed with this invention without modification, as the dispensing mechanism of this invention is associated with a can cover of novel and efficient construction. A delivery tube through which the milk passes from the can to the tumbler is slidably mounted on the can cover and the pipe through which pressure is introduced into the can is also supported on the can cover which is so constituted as to permit the parts to be readily dismantled for cleaning and to also allow of sterilization of the parts while associated with the cover and the subsequent filling of the can after the parts have been thoroughly sterilized as a unit, as will be hereinafter more fully explained.

The feed of air under pressure into the can and the control of the outflow of milk through the milk delivery tube is adapted to be accomplished according to the present invention by dispensing apparatus forming part of the retail dealer's equipment and so constituted that it can be coupled to one can of milk at a time as occasion may require and to be operated by the retailer in such a way that the dispensing of the milk by compressed air is manually controlled. An important feature of the invention is inherent in the fact that no part of this dispensing mechanism comes into contact with the milk and even though the dealer may be careless as to the cleaning of the dispensing mechanism, pollution of the milk cannot possibly occur.

Generally speaking, the dispensing mechanism embodies a motor driven pump controlled by a switch which, in turn, is manually controlled and with which is coupled a member for controlling the outflow of milk through the dispensing tube. The pump is provided with an air inlet in which is incorporated a filter and with an outlet for air under pressure which also includes a filter and from this latter filter a flexible tube leads to the pressure pipe of the can. The parts are so organized that, when an appropriate operating handle is actuated, the discharge tube is unsealed to permit the dispensing of milk, and the switch is simultaneously closed to energize the motor which acts upon the pump to supply air to the can. The air is delivered into the can near the bottom of the milk therein and in passing up through the milk agitates the same to insure an equitable distribution of the cream and, as the air accumulates in the top of the can above the surface of the milk, it builds up pressure to force the milk out through the discharge tube. As soon as the desired amount of milk has been drawn, the handle is released and mechanical means automatically functions to seal the outlet tube, so that the milk immediately ceases to run even though pressure remains in the can.

With the present invention there is no after flow which would tend to cause the milk to run over the top of the tumbler nor is there excessive dripping.

The invention embodies numerous other features and advantages which will be hereinafter explained and set forth in the appended claims.

The accompanying drawings illustrate one practical embodiment of the invention, but the construction therein shown is to be understood as illustrative, only, and not as defining the limits of the invention.

Figure 1 is a central section through an assembly embodying the present invention showing the parts coupled up for the dispensing of milk.

Figure 2 is a central section of the upper portion of the can showing the same in condition for shipment.

Figure 3 is a plan view of the main portion of the cover with certain parts removed. In this figure, the line 1—1 indicates the plane in which the section is taken for Figure 1 while a broken line 2—2 indicates the plane in which the section is taken for Figure 2.

Figure 4 is a section taken in the plane of the line 4—4 of Figure 3, but showing the air connections with the pressure tube.

Figure 5 is a central section of the upper portion of the discharge tube and pressure member for controlling the exit of milk therefrom.

Referring first to Figures 2 and 3, 1 indicates a conventional delivery can. There is nothing new about this particular can as the present invention does not necessitate the employment of any special can body. The body has a neck 2 and the usual handles 3.

A novel form of cover which I employ preferably comprises a central section which, in practice, is drawn up from sheet metal to comprise a skirt 4 adapted to fit into the neck of the can 2 and a top 5 having therein three openings formed within upstanding annular flanges 6, 7 and 8. The opening within the flange 6 is a sterilizing and filling opening. The opening within the flange 7 is for the dispensing tube, and the opening within the flange 8 is for the pressure tube. The flange 6 is reinforced by a ring 9 which embraces the flange and is provided with a seat 10 for a closure disk 11. The other flanges 7 and 8 are slightly flared to enable rubber fittings, hereinafter described, to better grip and hold onto the same.

Welded to the upper portion of the skirt 4 is an annular convex hood 12 of sheet metal, the outer periphery of which is curled as at 13 to provide a finished edge. This part 12 is of conventional shape and overlies the flare at the top of the neck 2 in the usual way. Welded over the joint between the skirt 4 and the hood 12 is an upstanding ring 14. This ring extends upwardly for some little distance above the upper edges of the flanges 6, 7 and 8 and is adapted for cooperation with the skirt 15 of a protective hood 16 to which the skirt 15 is permanently attached. The skirt 15 has a sliding fit with the ring 14, so that it may be readily positioned on or removed from the ring. The purpose of this hood is to overlie and protect the cover and the operating parts associated therewith during shipment of the can.

The hood 16 is preferably perforated as is also the part 12 so that the hood 16 may be locked in place during shipment by one or more wires 17 passed through these perforations and twisted as shown in Figure 2. The cover of the can is adapted to be secured in place by an appropriate wired seal or seals 18 which may pass through one or both of the handles 3 of the can.

The dispensing tube comprises two telescoping sections 19 and 20, the latter of which is adapted to rest on the bottom of the can, while the former of which is adapted to pass through the opening provided by the flange 7 in the cover. To the upper end of the section 19 is rigidly secured a head 21 and also formed with the head 21 and laterally of the section 19 is an outlet spout 22. The top of the tube and the top of the outlet spout are flush with the upper flat face of the head and on this flat face rests a diaphragm 23 of rubber or other elastic material. This diaphragm is secured to the head by means of a sealing ring 24, the upper and lower margins of which are wiped inwardly over the upper and lower margins of the head to hold the diaphragm in place. This ring 24 is readily disruptible by authorized persons at the creamery to permit of the removal of the diaphragm and its replacement in order to allow of thorough cleaning of the parts.

The dispensing tube is adapted to pass through a rubber bushing 25 associated with the dispensing opening of the can cover. This rubber bushing is provided with an enlarged upper end in the under side of which is an annular channel adapted to be sprung down over the flange 7 as shown best in Figures 1 and 2 so as to form a fairly tight fit with this flange. The upper portion of the bushing is flanged inwardly as at 27 to engage the upper section 19 of the tube with a close sliding fit adapted to hold pressure within the can while at its lower end the bushing has an inturned flange 28 having corresponding engagement with the lower section of said tube. Between the flanges 27 and 28, the bushing has an enlarged interior to house a peripheral flange 29 on the upper end of the tube section 20. With this arrangement the lower section 20 may be adjusted to engage with the bottom of the can while the upper section is free for rectilinear movement through the flange 27.

The pressure tube 30 shown best in Figure 4 is adapted to be passed loosely downwardly through the opening within the flange 8 to approximately the bottom of the can and is flared at its upper end to seat upon the top of this flange. Seated on the top of the flared upper end of the pressure tube 30 is a rubber gasket 31 having an external skirt 32 which embraces the flange 8 and also having an integral nipple valve 33 provided in the base thereof with a slit 34. This nipple valve extends downwardly into the upper portion of the tube 30 and is so constituted that when pressure is admitted into the nipple the slit 34 will open, so that compressed air may pass downwardly through the pipe and bubble up through the milk in the can for the purpose of agitating the same and building up pressure in the upper portion of the can above the surface of the milk therein for the purpose of forcing the milk upwardly through the dispensing tube. It will be noted from Figure 4 that the flange 8 of the cover top 5 is provided with a series of perforations 35, so that if too much pressure is built up in the can, the pressure may escape around through the clearance space between the tube and the flange 8 and pass through the opening 35, the skirt 32 yielding or stretching to permit the pressure to escape. In this way, the skirt 32 serves as a safety or blow-off valve. A hole 30a in tube 30 next to the nipple valve permits equalization of pressures within and without tube, so that back pressure cannot force milk upwardly into passage 55 even though the nipple valve failed to properly function as a check valve.

Inasmuch as pressure must be built up within the can, it is necessary that some means be provided for holding the gasket 31 in place on the flange 8, the bushing 25 in place on the flange 7, and the seal 11 in place on the seat 10. As shown in the drawings, this means is in the form of a plate 36, shown in section in Figures 1 and 2 and in plan in dot and dash lines in Figure 3. This plate has on its under side an annular flange 37 adapted to rest on the seal 11. The body of the plate is shaped to rest on top of the bushing 25, as shown in Figures 1 and 2 and on the top of the gasket 31, as shown in Figure 4. Adjacent the gasket 31 the plate is shaped to provide projecting ears 38. On the top 5 of the cover is welded an upstanding threaded stud 39 projecting through a hole in the base of a recess or depression 40 formed in the plate 36 and a nut 41, shown as circular with a flat face to be acted upon by a special wrench, is screwed on to the stud and bears downwardly against the base of the recess to force the plate firmly into position, so that the several closures to which I have referred will be secured against displacement by pressure which may be built up within the can. In order to insure a proper clamping action of the plate, said plate is preferably provided with an extension 42 adapted to bear on the flange of the ring 14, as shown in Figures 1 and 2. When the nut is screwed down tightly, the plate will be firmly held in position for the purposes specified.

The parts as shown in Figures 2 and 3 represent their relation as the filled can is shipped from the creamery to the retailer. When it is received by the retailer, he cuts or loosens the wire 17 and removes the protective hood and thereupon places the can in cooperative relation with the dispensing apparatus shown in Figure 1. This dispensing apparatus is mounted in a suitable casing 43 which may be placed on an appropriate counter or form part thereof. Within the casing is a motor 44, a pump 45 and a switch 46. The switch is included in an electric circuit 47 which controls the motor. The inlet to the pump is provided with an air filter 48 while the outlet has an air filter 49. Connected to the outlet and beyond the filter is a flexible hose 50 which leads to a connector, shown in Figure 1 in elevation and in Figure 4 in section. The connector comprises a casing or retainer 51 provided at its bottom with a pair of oppositely positioned rigid jaws or hooks 52 adapted to be engaged with the projections or tongues 38 of the plate 36.

Within the casing 51 is a plug 53 having oppositely projecting operating arms 54, one of which is connected, as shown in Figure 1 to the flexible tube 50. A passage 55 leads through this latter arm to the base of the plug and below the lower end of the plug is a tapered seat 56 adapted to engage with the inner periphery of the gasket 31 under the impulse of a spring 57. To attach the connection in cooperative relation to the pressure tube 30, the upper end of the casing is placed in the palm of the hand and two of the operator's fingers are placed beneath the arms 54 and the arms are thereupon drawn up to compress the spring 57 until the lower end of the plug 53 is above the hooks 52. The hooks are then engaged with the projections 38 of the plate with the plug 53 coaxial with the gasket 31. When the parts are in this position, the arms 54 are released and the spring 57 forces down the plug to a firm seat on the gasket 31 and provides a substantially air-tight connection between the pressure tube 30 and the pump.

Mounted on the top of the casing 43 is a housing 58 at one side of which is an exterior bifurcated bracket 59. When the can is in predetermined position with respect to the casing 43, the upper section 19 of the dispensing tube is adapted to be drawn upwardly sufficiently to engage its dispensing head 21 with the bifurcated bracket 59 in such a way that the head will rest on top of the bracket, while the tube section 19 and the spout 22 will be positioned in the opening of the bracket, so as to support the weight of the section 19 and to preclude its rotation. The lower end of the section 19 is exteriorly returned upon itself as shown at 19a in Fig. 1 and a metal ring 19b loosely embraces said section between the flanges 27 and 28, so that the section 19 cannot be inadvertently pulled out of the rubber bushing because the part 19a will engage with the part 19b which will in turn engage with the flange 27 and preclude this. However, a strong pull can release the parts for cleaning at the creamery.

When the head is in this position, a pressure member 60 is adapted to rest upon and bear against the rubber diaphragm 23. This pressure member is rigid with a plunger 61 which is guided for vertical reciprocation in the top and bottom of the housing 58 and carries within the housing a relatively rigid yoke 62. A compression spring 63, acting downwardly upon the yoke, normally seats the pressure member 60 firmly upon the diaphragm 23.

Pivoted in the side of the housing is a lever 64, one end of which carries a handle 65, while the other end is pivotally connected to the yoke, so that if this handle is depressed, the yoke may be elevated to lift the pressure member 60 from engagement with the diaphragm 23, as shown in Figure 5. The lower end of the plunger is extended at 66 and is adapted to act upon the switch 46.

The parts are so arranged that, when the handle 65 is depressed by the operator to lift the pressure member 60, the switch 46 will complete the motor circuit, so that the motor will run and drive the pump 45 for the purpose of drawing air into the pump through the filter 48 and discharging it under pressure through the filter 49. The compressed air thus fed through the pipe 50 will enter the compression tube 30 and pass downwardly therethrough into the can. Leaving the lower end of the tube, the compressed air will bubble up through the milk, thoroughly agitate the same and build up sufficient pressure within the can to force the milk upwardly through the discharge tube.

As the pressure member 60 is free from the diaphragm 23, the pressure of the milk against the bottom of this diaphragm will bulge the diaphragm upwardly as shown in Figure 5 and permit the milk to pass to and out of the outlet spout 22, as shown by the arrows in this figure. The milk will continue to flow as long as the handle 65 is elevated, because the motor will continue to run and the air pressure will be supplied. As soon, however, as the handle is released the spring 63 will force down the plunger 61, open the switch 46 and simultaneously force pressure member 60 down onto the diaphragm 23, causing the latter to be flattened out and held firmly to a seat against the flat top of the head 21, so that the flow of liquid will be immediately shut off even through pressure remain in the can.

If the apparatus is operated frequently this pressure in the can will hold to some extent although there is bound to be some little leakage. This, however, is desirable because there should be some air introduced into the can for every dispensing operation in order that the milk may be agitated to distribute the cream therein. The advantage of this construction is that there is agitation every time dispensing takes place and agitating air must be admitted with every dispensing operation and contemporaneously therewith. There can be thus no such stratification of the cream as would result in lack of proper mixture thereof with milk.

The entire contents of the can will be dispensed by the glass or tumbler in the manner described and when the can is emptied in this way, it is disconnected by reversing the attaching operations described. Protective hood 16 is then applied to the can and sent back to the creamery. Arriving there the protective hood is removed, the cover is taken from the can, and the parts associated with the cover are dismantled. The nut 41 is removed to detach the pressure plate 36. The seal 11 is taken out and the bushing 25 is drawn upwardly out of the cover carrying with it the dispensing tube. The pressure tube is removed in the same way. The rubber parts are thereupon detached from said tubes and all of the parts are thereupon completely cleaned for they are in a readily accessible position for an efficient cleaning operation.

After complete cleaning, the parts are re-assembled on the cover with any such replacement parts as may be desired, but without seal 11. The parts, completely assembled on the cover with the exception of the pressure plate 36, are next placed in standard sterilizer equipment and thoroughly sterilized. Thereafter milk is introduced into the can through the filler opening and the seal 11 is then applied and is followed by the pressure plate 36 and the nut 41. The protective hood is placed on the ring 14 and the wire 17 and seal 18 are applied. The filled can is thereupon ready for shipment in a thoroughly sterile condition to be received by the retail dealer and associated with the dispensing apparatus shown in Figure 1 as hereinbefore explained.

It will be apparent from the foregoing detailed description that the present invention embodies many novel features. It is an unusually simple construction for the work and the results which it accomplishes. The parts thereof are not apt to get out of order and the structure is not costly to manufacture or maintain. So long as the motor will operate and drive the pump, the parts cannot fail to operate and, when operating, will dispense milk by the tumbler without overrunning or dripping. The can and all parts which come into contact with the milk are maintained in a thoroughly clean and sterile condition without any intervention of the retail dealer as this phase of the procedure is entirely within the control of the creamery.

It has not been thought necessary to show details of the motor, pump or filters, as these may be conventional. In practice, however, a filter should be employed that can be periodically changed, so that the filtering medium will be clean at all times. The value of a double filter is that the air coming into the pump is filtered while the air leaving the pump is also filtered to remove therefrom any particles of foreign matter that may result from wear of the pump parts.

It will also be noted that the discharge tube section 20 is self adjusting in a vertical direction, so that when the cover is placed on the can, the lower end of this section will engage with the bottom of the can and as the cover is pushed down to proper position, the upper end of the section 20 can adjust itself vertically of the bushing 25 to such extent as may be necessary to permit of seating of the cover. I have found in practice that cans are frequently so roughly handled that the neck 2 of the can may be bent and if the cover is relatively rigid, great difficulty is experienced not only in forming a tight seal between the cover and the can neck, but after this seal is formed, it is frequently necessary to use a sledge hammer to remove the cover from an empty can. This results in damage to the parts and is altogether unsatisfactory. For this reason I have shown the cover skirt 4 as provided with a peripheral annular channel 4a in which is positioned a relatively soft rubber ring and I make the skirt 4 without other reinforcement at its lower end, so that it can readily conform to the shape of the can neck and any deformities therein, while the rubber ring will form a tight seal against the escape of pressure. I find that this simple expedient overcomes considerable difficulty in the carrying out of the present invention. The rubber ring is readily removable for sterilizing.

The fact that all of the parts which enter into the dispensing of the milk are mounted exteriorly of the can cover is highly important from a practical standpoint. They are above the surface of the milk at all times and are freely accessible and they do not require a recessing of the can cover. When a can cover is recessed to provide a cup shaped structure as has so often heretofore been used, water, frequently polluted, tends to lodge in such cup shaped structures and is altogether undesirable. With the present invention, on the contrary, the top 5 of the cover is flush and the flanges 6, 7 and 8 extend above the same. The ring 14 serves as a protective medium and is provided around its base with a series of perforations 14a to permit drainage of any water which would otherwise tend to lodge therein and as these holes are above the top of the can and above the part 12, water simply runs off without doing any harm to leave the top of the can dry. No water can possibly flow from the top of the cover into the can nor can it accumulate therein. The particular can cover which I have disclosed is of great practical importance because it is economical, thoroughly sanitary and highly efficient. Moreover, it is relatively light and all the parts associated with it are light and it forms a unit that can be handled as such with any conventional can body, so that no change whatever is required in the can construction in order to adapt the present invention thereto. This results in marked economies over prior practice.

The foregoing detailed description sets forth the invention in its preferred practical form and the invention is to be understood as fully commensurate with the appended claims.

Having thus fully described the invention, what I claim as new and desire to secure by Letters Patent is:

1. In an assembly of the character described, a milk can provided with a discharge tube having a valved outlet and said can also having a separate air inlet into the interior of the can and at all times submerged by the milk in the can, in combination with means for supplying air under pressure to the air inlet, means for controlling the valve of the discharge tube outlet, and an operating member for simultaneously controlling both the means for supplying air to the air inlet and the means for controlling the valve of the discharge tube outlet.

2. In an assembly of the character described, a milk can provided with a discharge tube having a valved outlet and said can also having a separate air inlet into the interior of the can and at all times submerged by the milk in the can, in combination with a single manually operable operating member for controlling the admission of air to the air inlet to air agitate the milk in the can and place it under pressure and the opening of the valve of the outlet, and a spring for shutting off the air to the inlet and simultaneously closing the valve of the outlet when the handle is released.

3. In an assembly of the character described, a milk can provided with a discharge tube having a valved outlet and said can also having an air inlet into the interior of the can and at all times submerged by the milk in the can, in combination with a normally inactive motor driven pump for supplying air to the air inlet to air agitate the milk in the can and place it under pressure, an electric circuit including a switch for controlling the operations of the motor driven pump, a valve operating member for the outlet valve, a spring normally acting upon the switch and the valve operating member to close the valve and open the switch, and a manually operable member for simultaneously operating both the switch and the valve operating member to open the valve and close the switch.

4. A milk can having in one wall thereof a peripherally flanged opening, a rubber bushing extending through said opening and having a skirt extending over and exteriorly embracing said flange, a pair of telescoping tubes, one of which is closely and frictionally embraced by one end portion of the bushing while the inner one of which is closely and frictionally embraced by the other end of the bushing.

5. A milk can having in one of its walls a peripherally flanged opening, a tube extending through said opening and flared at its outer end to seat on the free edge of said flange, a gasket bearing on the flared end of the tube and provided with a peripheral skirt embracing the exterior of said flange and having a nipple valve extending into the end of the tube.

6. A milk can having in one of its walls a peripherally flanged opening, a tube extending through said opening and flared at its outer end to seat on the free edge of said flange, a gasket bearing on the flared end of the tube and provided with a peripheral skirt normally closely embracing the exterior of said flange and having a nipple valve extending into the end of the tube, said flange having therein openings normally covered and sealed by said skirt which is adapted to be distended to permit release of excess pressure from within the can through said openings.

7. A milk can having in one of its walls an opening provided with a peripheral flange having an aperture therein, an elastic gasket closing said opening and having a skirt closely embracing the exterior of the flange for normally sealing said aperture, said flange being adapted to be distended by pressure within the can to permit release of excess pressure from within the can through the aperture in the flange.

8. A milk can cover provided in its top with filling and discharge openings surrounded by peripheral flanges, an upstanding ring mounted on the top of the cover and extending upwardly to a point above the flanges about said openings, and a hood having a detachable slip connection with said ring to cover and conceal the filling and discharge openings.

9. A milk can cover having a central inverted cup section provided in its top with filling and discharge openings, each of which is surrounded with an upstanding peripheral flange, a hood circumferentially of said central cup section to cover the lip of an associated can, an upstanding ring on said cover projecting to a plane above the tops of said flanges, and a protective hood having a detachable fit with said ring to cover and conceal the filling and discharge openings.

10. A milk can cover having a central inverted cup section provided in its top with filling and discharge openings, each of which is surrounded with an upstanding peripheral flange, a hood circumferentially of said central cup section to cover the lip of an associated can, an upstanding ring on said cover projecting to a plane above the tops of said flanges, and a protective hood having a detachable fit with said ring to cover and conceal the filling and discharge openings, said ring having drain apertures near its base and below the upper edges of said flanges.

11. A milk can having in one wall thereof a pressure opening surrounded by a peripheral flange, an annular gasket associated with the free end of said flange forming a seat, a pressure plate clamped against said gasket, a pressure plug projecting into the center opening of said gasket, a retainer detachably engaged with the pressure plate, and a spring interposed between the retainer and the plug to hold said plug to its seat with respect to the gasket.

12. A milk can cover provided in its top with an opening surrounded by an upstanding flange, a pressure tube projecting downwardly through said flange and flared at its upper end to seat on said flange, an annular gasket seated on the upper flared end of said tube and having a central nipple valve projecting into the tube, a pressure plate resting on said gasket to hold it to its seat on said tube, a plug projecting through the gasket into the nipple valve and seated with respect to the gasket, a retainer detachably mounted on the pressure plate, and a spring interposed between the retainer and the plug to hold the plug to a firm pressure tight seat with respect to the gasket.

13. A connector comprising a tubular member closed at one end and provided at the other end with opposed jaws, a plug mounted to reciprocate within the tubular member and having a passage leading therethrough, and a spring interposed between the plug and the closed end of the tubular member to normally project the remote end of the plug beyond the jawed end of the tubular member.

14. In an assembly of the character described, a milk can having a discharge tube projecting downwardly through the top of the can to the bottom thereof and provided with an outlet spout at its upper exterior end, and a separate pressure tube also projecting downwardly through the top of the can to the bottom thereof with the lower ends of both the discharge and pressure tubes at all times submerged in the milk in the can, in combination with a motor driven pump for supplying pressure to the pressure tube, valvular means for controlling the flow of milk from the can through the discharge tube and outlet spout, and means for simultaneously controlling both the motor driven pump and said valvular means to permit air agitation of the milk in the can and the flow of milk from the can when the pump is turned on and to shut off the pump and discontinue the air agitation when the flow of milk is shut off.

WILLIAM TAMMINGA.